INVENTORS
DAVID C. HARPER
RAYMOND T. WRIGHT
JAMES E. YOUNG
BY
ATTORNEY

INVENTOR.
DAVID C. HARPER
RAYMOND T. WRIGHT
JAMES E. YOUNG
BY
ATTORNEY

United States Patent Office 3,307,157
Patented Feb. 28, 1967

3,307,157

LIGHT SCAN RECORDING AND READOUT

David C. Harper, Rochester, Raymond T. Wright, West Webster, and James E. Young, Pittsford, N.Y., assignors to Xerox Corporation, Rochester, N.Y., a corporation of New York Filed Jan. 2, 1964, Ser. No. 335,259
3 Claims. (Cl. 340—173)

This invention relates to data recording and readout using a photosensitive recording mechanism and a moving spot of light.

In data handling, storage density and ease of access are perhaps the two most significant elements. Unfortunately ease of access is not always compatible with high density to that frequently as density is increased accessibility decreases. One of the techniques for improving accessibility is to store the information on discs. This enables immediate access to the entire recorded surface without the delay involved in reeling and rereeling tapes or card sorting. Due to the low density capabilities of magnetic recording, magnetic discs have had to be fairly large to carry a reasonable amount of information. Thus magnetic discs are usually about 24 to 39 inches in diameter. In order to provide structural strength with these diameters, considerable mass is added. Since ease of magnetic recording generally dictates that the recording surface be moved, added mass requires larger motors. Also the mechanical assembly for positioning the recording heads tends to become massive and slow in operation due to the distance it must be able to move.

Use of a higher density storage media with disc techniques would appear highly desirable. Photographic film is an apparent possibility with its extremely high resolution capabilities. One form of disc operation with photographic film is described in Optical Processing of Information, Pollock, Koester and Tippett, 1963, published by Spartan Books, Inc. of Baltimore at pages 181 to 188. The system described there mechanically rotates the photographic disc and mechanically positions the optical system along the radius of the disc.

Now in accordance with the present invention a photosensitive disc storage element is used in a system employing electronic flying spot scanning with no mechanical motion. This all electronic system eliminates the inherent delays of the mechanical system. Thus, it is an object of the present invention to define a novel system of disc data storage and readout using phootsensitive media.

It is a further object of the present invention to define a method of data storage and readout on a photosensitive disc by electronic scanning.

Further objects and features of the invention will become apparent while reading the following description in connection with the drawings wherein.

A record and readout system in accordance with the present invention uses a flying spot scanner, a photosensitive member, and a photosensing device. In a preferred embodiment, the flying spot scanner has a circular sweep. This sweep is maintained accurately in predetermined tracks on the photosensitive recording member by means of tracking indicia preprinted on the recording member together with an electronic servo loop.

Figure 1:
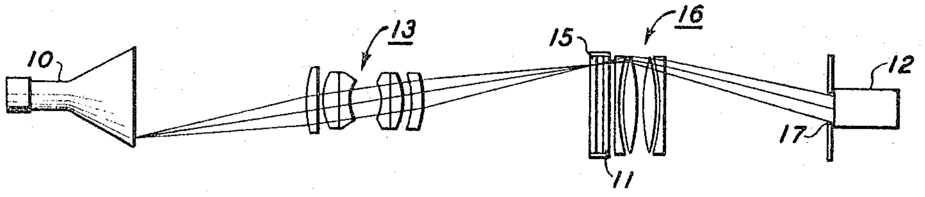
FIGURE 1 is a diagrammatic illustration of an optical system for record and readout of a photosensitive medium.

The optical system is illustrated in FIGURE 1 as comprising cathode ray flying spot scanner 10, photosensitive media 11 and photosensing device 12. While the photosensitive media is depicted in FIGURE 1 as a transparent material for transmission projection, it will be understood that, with suitable arrangement of the optics an opaque photosensitive media can also be used with projection of the image by reflection techniques.

The particular photosensitive media is not critical to the present invention and may suitably be photographic film or some form of xerographic plate. The recently developed forms of electrophotographic media using deformable films are also quite suitable for the present invention. As used herein, "photosensitive media" is intended to encompass the commonly known forms of photosensitive media in either a sensitive or non-sensitive condition. Thus, photographic film for the purposes of this application is considered to be a photosensitive media even though it has been exposed and developed and can no longer be made sensitive. Support frame 15 positions photosensitive media 11 in the optical system. Support frame 15 preferably includes transparent cover plates to protect the photosensitive media from dust and abrasion.

In operation an image is recorded on photosensitive media 11 by scanning the media with a light spot from flying spot scanner 10 while modulating the light spot in accordance with information to be recorded. The latent image thus produced on the photosensitive media is then developed and may be read out by scanning the media with flying spot scanner 10 while maintaining a constant spot intensity and illuminating the aperture of photosensing device 12. The light as modified by the developed media illuminates aperture 17 of photosensing device 12. Photosensing device 12 is suitably a photomultiplier tube or other photo-detecting device capable of putting out an electrical signal representative of varying light intensity.

While all processing of the photosensitive media can be carried out while in a fixed position in the optical system, it is an advantage of the present arrangement that the media may be readily removed and replaced without danger of introducing tracking inaccuracies. Thus, development can be performed by removing the media to separate development apparatus. The developed media is then returned to the optical system for readout as desired.

Figures 2, 3:
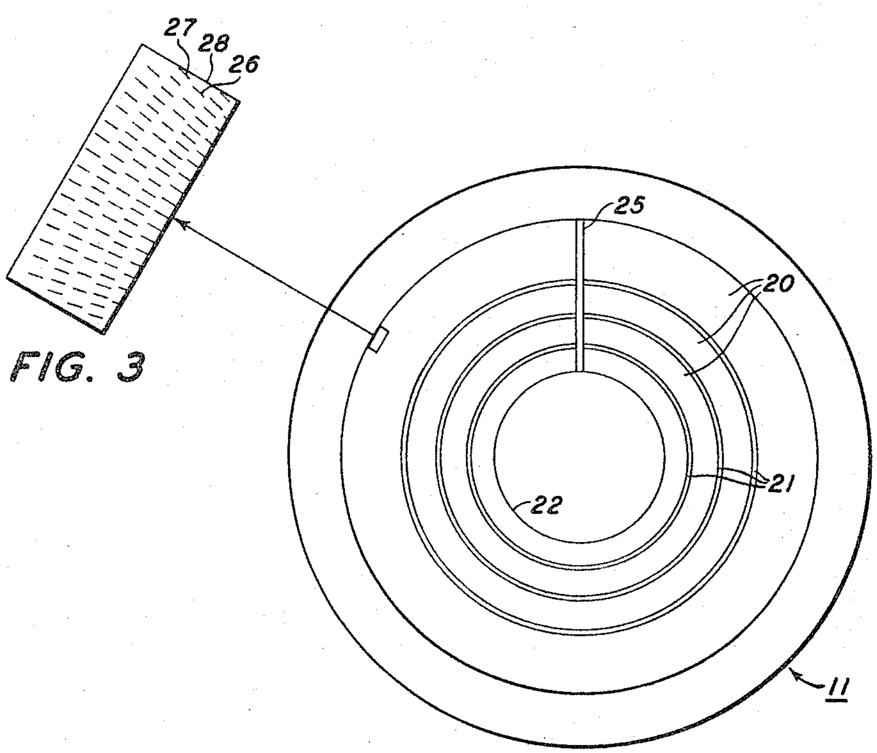
FIGURE 2 is an illustration of the photosensitive recording medium used in the optical system of FIGURE 1.
FIGURE 3 is a magnified portion of FIGURE 2 showing clock mark tracks and recording tracks.

The optical system employs objective optics 13 for imaging the CRT spot on the photosensitive medium. This is illustrated as a 1 to 1 relay. Enlargement or reduction is not worthwhile in the present state of the art. Enlargement would allow for a lower resolution media while in fact the most suitable media have greater resolution capabilities than present flying spot scanners. Reduction would allow readily for smaller media, but since the usable face diameter of present commercial high resolution cathode ray tubes is quite limited, the media size for a 1 to 1 ratio is not large. Media 11 is mounted in support means 15 illustrated as a frame with a glass protective cover. A set of collective optics 16 focuses the objective lens aperture on aperture 17 of photomultiplier 12. While not illustrated, it should be understood that deformation recording requires a somewhat more complex optical system due to the light scattering characteristics. Thus a mask may be placed in the objective optics. This mask is imaged by the collective optics on the photomultiplier aperture. Light diffused by the image will be scattered so that some of it will enter the photomultiplier tube aperture which normally is unilluminated due to the mask. When a mask is used for this purpose, it has been found desirable to provide a photomultiplier aperture somewhat larger than the mask image to permit passage of some light at all times providing for track sensing as will be fully explained below. FIGURE 2 illustrates an exemplary embodiment of the photosensitive media 11. While the media is illustrated here in a circular configuration, this is not a necessary limitation.

In many systems, greater ease of handling will be obtained with a rectangular configuration for media 11 in which only a circular portion of the media is used to carry information. Preference for a circular information carrying area on media 11 is dictated for optimum use of a cathode ray tube as a flying spot scanner. This is so since off-axis distortion is one of the greatest distortion factors in a cathode ray tube, and the maximum amount of area covered with a cathode ray tube with a minimum of off-axis operation is in a circular pattern. The use of a circular pattern also eliminates the need for retrace and retrace blanking in the operation of the cathode ray tube. Photosensitive media 11 is illustrated as comprising four recodring zones 20. Each zone comprises a plurality of recording tracks with a small amount of dead space 21 between the zones. Further dead space 22 is allowed at the center so that the shortest circular track will be able to carry a substantial block of information. Dead space 23 is also allowed at the outside of the member for handling purposes.

Breaking the recording surface up into zones is conventional in magnetic disc file memories. The reason here, as with magnetic disc memories, is to enable operation with the same cyclical rotation speed on tracks that are within a limited radius of the center. Then, when the scanning velocity becomes too great for economic density in recording, the cyclical rotation speed is stepped down so that the recording velocity on the inside track of an outer zone is the same as the recording velocity at the inside track of an inner zone. The number of zones used and the number of tracks used within each zone is not of critical significance and is varied to suit the requirements of particular systems. Generally, the width of the zones are adjusted so that the ratio of the radius to the inner track to that of the outer track for each zone is the same as that of every other zone. With these ratios observed, the recording velocity on every outer track will be the same as will be the recording velocity of every inner track. A more detailed discussion of zones and tracks can be found in "Disc File Memories" by Harold J. McLaughlin in the November 1961 issue of "Instruments and Control System," pages 2063–2068. Each track begins and ends at datum line 25. The datum line is recording space allocated for coding and address purposes.

To keep the CRT tracking in exact circles, clock marks are permanently printed in tracks on the surface of the recording media. As used herein the term "clock marks" is intended to define a series of identical marks evenly spaced so that the marks repeat as a function of a predetermined frequency. A small segment of the outer zone is enlarged in FIGURE 3 to show the clock tracks 26 and 27 on either side of a recording track 28. The clock marks are preprinted in opaque lines on the photosensitive media during manufacture. This preprinting of the clock marks may be accomplished in any one of several ways as desired, depending somewhat on the particular media used. When the media is photoconductive, such as used in xerographic processing, the clock marks may be put on in a straight forward xerographic manner by exposure through a transparency containing the clock marks and then conventional xerographic development with fusing right to the media. Various photo etching techniques are also suitable for imprinting the clock marks on the media. For simple servo circuitry as will be further disclosed below, it is necessary that the clock marks be accurately spaced in such a way that the clock frequencies will remain constant in each of the tracks for the scan rates used. This requires that within each zone the clock mark spacings have to increase with the successive tracks going toward the outer edge of the zone. However, the clock mark spacing for the inner track would be the same for all zones, since as has been stated above, the zones and scanning speeds are preferably arranged and selected so that the recording velocity is the same on the inner track of each zone. As shown in FIGURE 3, the clock marks on one side of a recording track have a higher frequency than on the other side of the recording track. Signals representing the clock marks are picked up by the photomultiplier tube and the servo circuitry operates to move the scanning beam radially to balance the signals of the two sets of clock marks. This can be understood better by referring to FIGURE 4.

Figure 4:
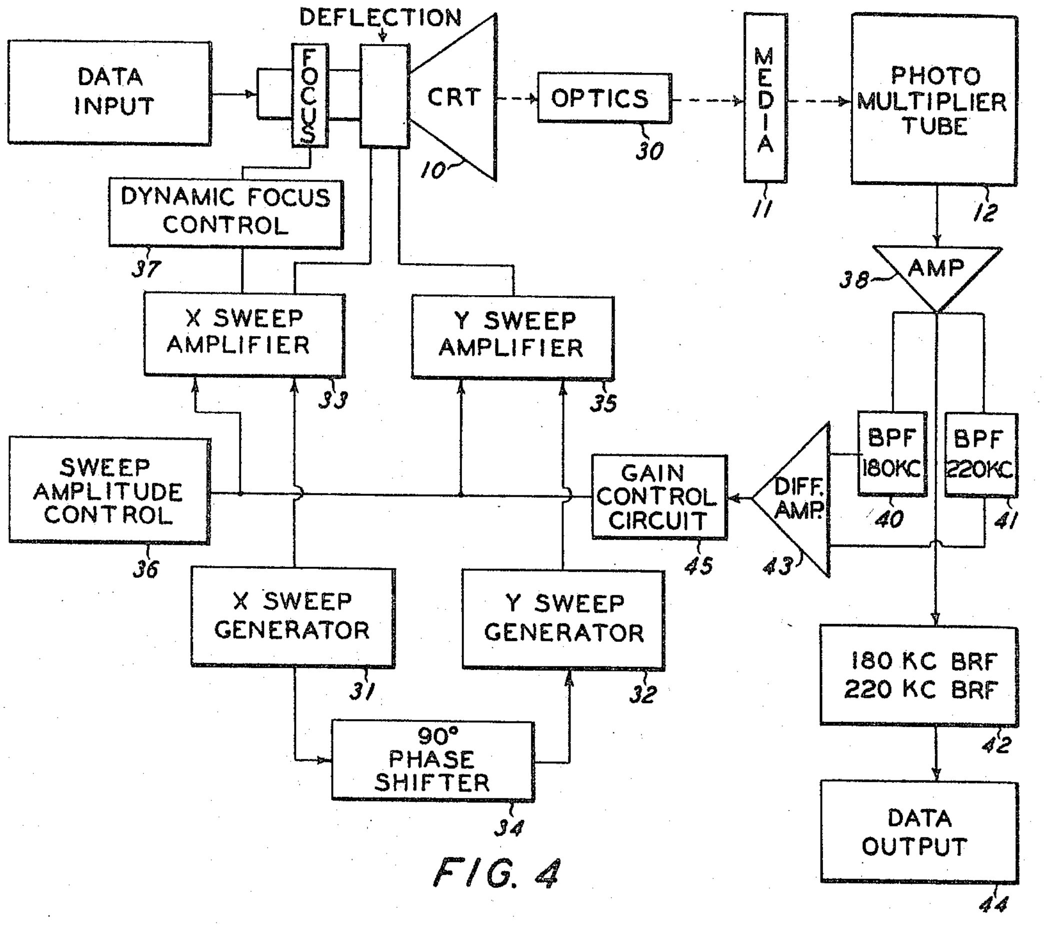
FIGURE 4 is a block diagram of a light scanning system for photosensitive media showing tracking control in accordance with the invention.

The system for circular scanning with tracking control is illustrated by block diagram in FIGURE 4 in an arrangement suitable as a sub-system for a data processing system. The flying spot scanner 10, media 11 and photosensor 12 are illustrated as in FIGURE 1. The optics similar to those in FIGURE 1 are lumped together in a block designated 30. The cathode ray tube spot is driven in a circular scan by means of X sweep generator 31 and Y sweep generator 32. For an accurate circular sweep, one of the sweep generators, for example the X sweep generator is controlled by a highly precise sinewave oscillator and the frequency output of the X sweep generator oscillator is shifted 90° by phase shifter 34 to operate the Y sweep generator exactly 90° out of phase with the X sweep generator. For this purpose it can be understood that the Y sweep generator can be just a buffer stage. The output of the sweep generators is amplified by X sweep amplifier 33 and Y sweep amplifier 35. Sweep amplitude control means 36 operates to control the amplification of the X and Y sweep amplifiers determining the diameter of the circular scan. For data processing purposes, the sweep amplitude control 36 would have to be connected in with data processing circuitry for changing the scan track. Likewise when the media is separated into zones as in FIGURE 2 having different cyclical sweep rates, the data processing circuitry would have to provide for changing the frequency of the sweep generators in switching from one zone to another. CRT 10, as illustrated, is preferably of the 5 CE high resolution variety having magnetic deflection coils and provisions for dynamic focusing. These can be obtained with larger face areas, however, at the present state of the art, ten inches can be considered a practical limit for purposes of the invention. Expense and bulk become prohibitive with larger face sizes and resolution becomes difficult to maintain. Dynamic focus control 37 is illustrated as using sweep amplifier current to determine the focus correction. Circuitry for dynamic focus correction is discussed in detail in "How To Achieve Uniform CRT Spot Focus Over Entire Screen" by L. E. White published in "Electronics Equipment Engineering" for April 1963, at pages 67–71. More detailed data on systems using a flying spot scanner and a photomultiplier tube can be found in "Optical Processing of Information" cited above at pages 168 and following. The output of the photomultiplier tube is amplified by amplifier 38 and then filtered into three signal channels by band pass filter 40, band pass filter 41, and band reject filters 42. Band pass filter 40 passes the low frequency clock signal which can be at about 180 kilocycles into the second input of difference amplifier 43. The remainder of the signal from amplifier 38 passes through band reject filters 42 for filtering out the clock signals from the information output channel. The information output is indicated by block 44. Difference amplifier 43 compares the output of low frequency band pass filter 40 and high frequency band pass filter 41 and provides a signal into gain control circuit 45 for changing the gain of both the X and Y sweep amplifiers simultaneously to change the diameter of the sweep circle sufficiently to balance the two clock signals.

The system illustrated by the block diagram of FIGURE 4 operates for readin and readout functions. For reading in, the information signal is applied to cathode ray tube 10 where it modulates the light amplitude of the spot to provide variations in light intensity as the spot sweeps the storage media 11. The selection of a particular recording track for recording the information and the particular track are all determined by datum line information as indicated at output 44. This is all controlled by the other components of a complete processing system and is beyond the scope of the present invention. In recording, the photomultiplier tube reads the clock marks, and the track correction circuitry including amplifier 38, filters 40 and 41, difference amplifier 43, and gain control circuit 45 operates through the sweep amplifiers to maintain the sweep diameter at the proper size for tracking. Assuming for simplicty that the clock marks on the outside of the recording track are 220 kc. and the clock marks on the inside of the recording track are 180 kc., the circuit will operate to keep these two clock mark signals evenly balanced. Thus, if the sweep begins to pass inward, it gives a stronger illumination from the 180 kc. clock marks producing a stronger 180 kc. signal at difference amplifier 43. This same movement of the spot will result in a weaker 220 kc. signal at difference amplifier 43. With the 180 kc. signal stronger than the 220 kc. signal, the difference amplifier will operate to increase the gain of the sweep amplifiers by means of gain control circuit 45 until the two clock signals of the difference amplifier are balanced. If the spot moves outward beyond the selected recording track, the 220 kc. signal will become relatively larger and the signal from the difference amplifier will be reversed, causing a decrease in the gain of the sweep amplifiers by means of gain control circuit 45.

After recording, media 11 is processed for development as necessary and is then ready for readout. For example when using a xerographic plate as media 11, it is developed by presenting an electroscopic pigmented powder to the surface of the plate. In the readout operation, no modulation is applied to the CRT spot, but the light as it reaches photomultiplier tube 12 is modulated by storage media 11 providing both clock marks and information signals. The track correction servo operation is the same as in record. However, the information signal is passed on to the information output 44 after filtering out the clock signals by filters 42. It should be noted that, in the record operation, 100% modulation of the CRT spot cannot be used, since some light is always necessary to pass the clock mark information to the photomultiplier tube. Likewise in readout, it is essential that the optical system be designed so that some light passing through the clock tracks always reaches the photomultiplier tube for track correction purposes.

While it is possible with the system as described above to maintain the memory storage media in a stationary position with all processing steps carried on without moving the media from the system, it is a particular advantage of the present system that the media can be readily moved. Even though the media becomes a little bit distorted in some manner or positioned a little bit off axis when replaced in the system, the track control circuitry maintains perfect tracking. Using some of the more recent photosensitive storage media in the present system, it is possible to erase and replace some of the recorded information at will. For example, using a frost electrostatic deformation system such as described in patent application 193,277, filed May 8, 1962, recorded information may be readily erased and new information recorded. While the present invention has been described using a cathode ray tube scanner in a circular mode, it is to be understood that a mechanical optical scanning system may be used as well with the tracking control circuitry controlling the motors providing mechanical motion to the elements of the optical system. The tracking control circuitry using the disclosed clock marks on the storage media is also operative with non-circular scanning modes. Oval and spiral modes are readily obtained merely by changing the positioning of the clock marks preprinted on the media in a configuration to describe the desired track.

What is claimed is:

1. Apparatus for scanning a photosensitive storage element in a data processing system comprising:

(a) a cathode ray flying spot scanner;

(b) means to position a photosensitive storage element, having recording tracks in concentric rings, in face-to-face relationship with said cathode ray flying spot scanner;

(c) a lens system arranged to focus the spot of said scanner on said element;

(d) two sine wave sweep generators of the same frequency;

(e) phasing means to maintain a 90° phase differential between said two sweep generators;

(f) two sweep amplifiers with their inputs connected to said sweep generators and their outputs connected to deflection elements of said scanner for operating said scanner in a circular sweep mode illuminating said element along the concentric rings of said recording tracks; and, (g) common amplitude control means connected to said two sweep amplifiers to simultaneously adjust the diameter of the scan circle to coincide with a selected recording track.

2. Apparatus for recording information on a photosensitive storage element comprising:

(a) a cathode ray tube;

(b) means to position said element while in a sensitive condition for exposure by said tube;

(c) a lens system arranged to optically focus the spot of said tube on said element;

(d) sweep generating means providing two sinusoidal signals of the same amplitude and frequency displaced 90° in phase connected to the deflection elements of said tube so that the spot of said tube sweeps in a circle;

(e) amplitude control means connected to said sweep generating means varying the amplitude of said two sinusoidal signals simultaneously to adjust the diameter of the scan circle for recording on a selected area of said element; and, (f) data input means connected to said tube to modulate the beam of said tube during scanning in accordance with information to be recorded so that said element is selectively illuminated to produce an image pattern corresponding with said information.

3. Apparatus for reading out information from a photosensitive storage element comprising:

(a) a cathode ray flying spot scanner;

(b) means to position a photosensitve storage element carrying information recorded in concentric circular recording tracks on a flat surface with said surface facing the screen of said cathode ray flying spot scanner;

(c) optical means to optically focus the spot of said scanner on said element;

(d) sweep generating means providing two sinusoidal signals of the same amplitude and frequency displaced 90° in phase connected to the deflection elements of said scanner so that the spot of said scanner sweeps in a circle illuminating said element along said recording tracks;

(e) amplitude control means associated with said sweep generating means for varying the amplitude of said two sinusoidal signals simultaneously to adjust the diameter of the scan circle to coincide with a selected recording track;

(f) photosensing means to sense the light as modified by the recorded information on said element; and, (g) output means connected to said photosensing means to provide an electrical output signal corresponding to said recorded information.

References Cited by the Examiner

UNITED STATES PATENTS

| | | | |
|---|---|---|---|
| 2,565,535 | 8/1951 | Tykulsky | 315—25 |
| 2,830,285 | 4/1958 | Davis | 340—173 |
| 2,843,841 | 7/1958 | King | 340—173 |
| 3,086,390 | 3/1963 | Brown | 315—25 |
| 3,195,113 | 7/1965 | Giordano | 340—173 |

OTHER REFERENCES

Emrich, Spiral Chronograph for Measurement of Single Millisecond Time Intervals With Microsecond Accuracy, The Review of Scientific Instruments, March 1947, vol. 18, No. 3, pages 150–157.

King et al., Photographic Techniques for Information Storage, Proceedings of the I.R.E., October 1953, pages 1421–1428.

BERNARD KONICK, *Primary Examiner.*

IRVING L. SRAGOW, *Examiner.*

R. G. LITTON, M. S. GITTES, *Assistant Examiners.*